United States Patent [19]

Hofmann

[11] Patent Number: 4,949,086
[45] Date of Patent: Aug. 14, 1990

[54] BROADBAND SIGNAL SWITCHING EQUIPMENT

[75] Inventor: Ruediger Hofmann, Gilching, Fed. Rep. of Germany

[73] Assignee: Siemens Aktiengesellschaft, Berlin and Munich, Fed. Rep. of Germany

[21] Appl. No.: 353,044

[22] Filed: May 17, 1989

[30] Foreign Application Priority Data

Jun. 8, 1988 [DE] Fed. Rep. of Germany ....... 3819491

[51] Int. Cl.$^5$ .............................................. H04Q 1/00
[52] U.S. Cl. .......................... 340/825.910; 340/825.87; 340/825.85; 301/241; 301/571
[58] Field of Search ...................... 340/825.79, 825.83, 340/825.84, 825.85, 825.86, 825.87, 825.88, 825.89, 825.9, 825.91, 825.92, 825.93; 379/291, 292; 307/239, 241, 279, 362, 363, 571, 573, 576, 231

[56] References Cited

U.S. PATENT DOCUMENTS

| 4,346,381 | 8/1982 | Bauch et al. | 340/825.86 |
| 4,577,190 | 3/1986 | Law | 340/825.91 |
| 4,746,921 | 5/1988 | Hofmann | 340/825.87 |

FOREIGN PATENT DOCUMENTS 0262479 4/1988 European Pat. Off. .
0264046 4/1988 European Pat. Off. .
2422136 2/1975 Fed. Rep. of Germany .
2608119 9/1976 Fed. Rep. of Germany .

OTHER PUBLICATIONS

Stein et al., "A 1-mil$^2$ Single-Transistor Memory Cell in n Silicon Gate Technology," IEEE Journal of Solid-State Circuits, vol. SC-8, No. 5, Oct. 1973, pp. 319-323.

Primary Examiner—Donald J. Yusko
Assistant Examiner—Dervis Magistre
Attorney, Agent, or Firm—Hill Van Santen Steadman & Simpson

[57] ABSTRACT

In a crosspoint matrix in which matrix input lines respectively comprising two signal conductors connected to differential outputs of differential line drivers lead to matrix output lines likewise each comprising two signal conductors and having signal outputs of a differential amplifier which has a trigger behavior connected thereto and wherein the two signal conductors of each matrix output line are respectively connectible via a pre-charging transistor to the operating voltage source, these two signal conductors also being connected to one another via a shunt transistor for an early balancing of potential. A pre-charging transistor, in addition to a sampling transistor, can be provided at a pseudo-grounded line associated to a matrix line.

6 Claims, 3 Drawing Sheets

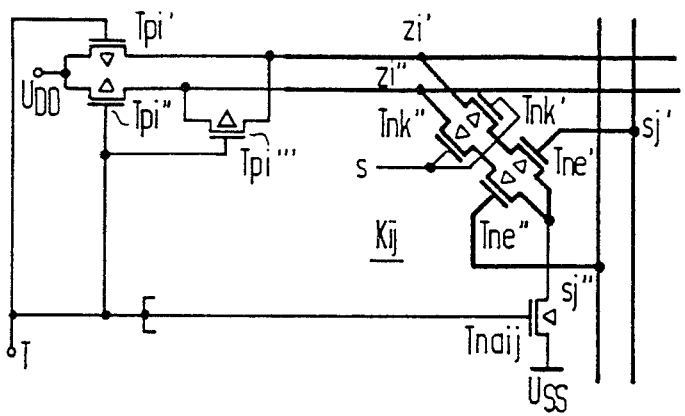
FIG 2
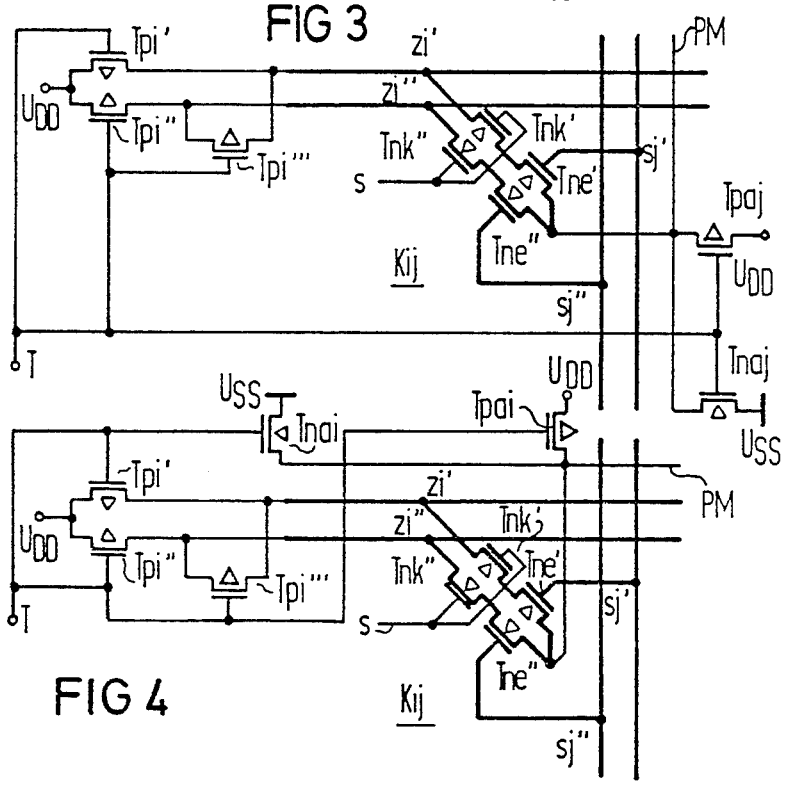
FIG 3
FIG 4

BROADBAND SIGNAL SWITCHING EQUIPMENT

BACKGROUND OF THE INVENTION

1. Field of the Invention

The present invention relates to broadband signal switching equipment and more particularly to cross point matrices constructed in field effect transistor technology.

2. Description of the Prior Art

If emitter-coupled logic (ECL) technology can be characterized by properties such as high working speed, moderately high degree of integration and moderately high dissipated power, then field effect transistor (FET) technology, given only moderate working speeds in comparison thereto, however, is distinguished by an extremely high degree of integration and by extremely low dissipated powers. These latter properties lead to efforts to penetrate into speed regions previously reserved for the bipolar technique with integrated circuits in FET technology.

Known in this context, from EP-A-O No. 264 046, is a broadband signal switching equipment comprising a crosspoint matrix that comprises matrix input lines respectively formed with two signal conductors which, first of all, are respectively connected to two differential (complementary) outputs of an input digital signal circuit and, secondly, can be connected via crosspoints to matrix output lines that likewise are respectively formed with two signal conductors. These matrix output lines have their two signal conductors respectively connected to the two signal inputs of an output amplifier circuit formed with a differential amplifier. A crosspoint matrix constructed in FET technology therefore has pairs of switching elements provided in the crosspoints and respectively formed of two switching transistors respectively charged with a through-connect signal or, respectively, inhibit signal at the control electrode. The switching transistors of these pairs of crosspoint switches respectively have a main electrode connected to the one or, respectively, other signal conductor of the appertaining matrix output line that is, in turn, provided with an output differential amplifier having a trigger behavior, whereby the pairs of crosspoint switches each respectively comprise two series transistors. The two series transistors respectively form a series circuit with a switching transistor, the series transistors respectively having their control electrode connected to the one or, respectively, to the other signal conductor of the appertaining matrix input line and having their respective main electrode that faces away from the series circuit connected via a sampling transistor to the one terminals (ground) of the operating voltage source to whose other terminal every signal conductor of the respective matrix output line is connected via a series transistor. The series transistors and the sampling transistor have their control electrodes respectively charged oppositely one another with a switching matrix network drive clock that divides a bit through-connect time interval into a precharging phase and into the actual through-connect phase, so that both signal conductors of the matrix output lines are charged via the respective precharging transistor at least approximately to the potential prevailing at the other terminal of the operating voltage source in every pre-phase given an inhibited sampling transistor.

In addition to the advantages that are connected with a crosspoint matrix constructed in FET technology, this known broadband signal switching equipment provides the further advantage that, first of all, given an inhibited crosspoint, no disturbing signals can proceed via the crosspoint to the matrix output, even without additional attenuating measures and that, secondly, and given a conductive crosspoint, charge reversals of the matrix output lines potentially occurring in the actual bit through-connection always proceed in only one charge-reversal direction from the one operating potential corresponding to the one signal state and, therefore, and unequivocal transition of the through-connected digital signal appearing at the output of the switching equipment from the one and the other signal state is already established with a small charge reversal (corresponding to the transgression of a threshold adjacent to this value of operating potential and corresponding to the break over point of the differential amplifier) and, therefore, correspondingly fast.

SUMMARY OF THE INVENTION

The object of the invention, therefore, is to enable a further improvement in the working speed in such a broadband signal switching equipment.

The present invention is therefore directed to a broadband signal switching equipment comprising a crosspoint matrix constructed in FET technology that comprises matrix input lines respectively formed with two signal conductors, the respective two signal conductors thereof being connected, first of all, to the two differential outputs of an input digital signal circuit comprising two such differential outputs and, secondly, are connectible via the crosspoints formed with pairs of switching elements to matrix output lines that are likewise respectively formed with two signal conductors. The matrix output lines respectively have their two signal conductors leading to the two signal inputs of an output amplifier circuit formed with a differential amplifier having a trigger behavior, whereby the pairs of switching elements are respectively formed with two switching transistors that are respectively charged with a through-connect signal or, respectively, inhibit signal at the control electrode and that have a main electrode connected to the one or, respectively, to the other signal conductor of the appertaining matrix output line. The pairs of matrix elements respectively comprise two series transistors that respectively form a series circuit with a switching transistor. The series transistors respectively have their control electrodes connected to the one or, respectively, to the other signal conductor of the appertaining matrix input line and their main electrode that faces away from the series circuit connected via a sampling transistor to the one terminal of the operating voltage source to whose other terminal every signal conductor of the respective matrix output line is connected via a precharging transistor. The precharging transistors and the sampling transistors have their control electrode respectively charged opposite one another with a switching matrix network drive clock that sub-divides a bit through-connect time interval into a precharging phase and into the actual through-connect phase, so that both signal conductors of the matrix output lines are charged via the respective pre-charging transistor at least approximately to the potential prevailing at the other terminal of the operating voltage source, being approximately charged thereto in every pre-phase given an inhibited sampling transistor. This broadband signal switching equipment is characterized, according to the present invention, in that the two pre-charging transistors are connected to one another at their main electrodes facing toward the respective matrix output line, being connected to one another via a shunt transistor whose control electrode is connected to the control electrodes of the pre-charging transistors.

In combination with the advantage of an acceleration of the pre-charging of the matrix output lines, the present invention produces the further advantage of an extremely early balancing of the potentials of the matrix output lines, so that the initial conditions for reliable amplification by a following differential amplifier are also established at a correspondingly early time.

A further increase in the working speed of the broadband signal switching equipment is obtained when, in accordance with a further feature of the invention, a precharging transistor associated to the matrix input line is provided in addition to a sampling transistor associated with a matrix input line or, alternatively thereto, when a pre-charging transistor associated to a matrix output line is provided in addition to a sampling transistor associated to a matrix output line.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a schematic representation of a circuit constructed in accordance with the invention which may be employed in the matrix of the equipment of FIG. 1;

FIG. 3 is a schematic representation of a circuit constructed in accordance with the invention which may be employed in the matrix of FIG. 1;

FIG. 4 is a schematic representation of a circuit constructed in accordance with the invention which may be employed in the matrix of FIG. 1.

DESCRIPTION OF THE PREFERRED EMBODIMENTS

Figure 1:
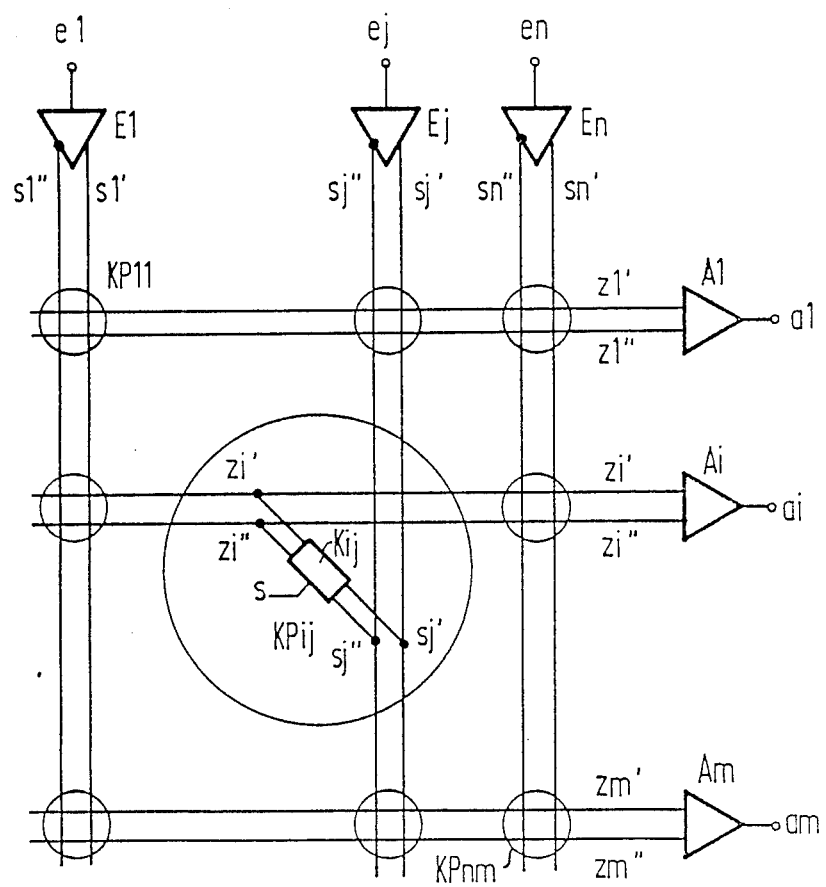
FIG. 1 is a schematic representation of a broadband signal switching equipment as is generally known in the art.

Referring to FIG. 1 there is a schematic illustration of a known broadband signal switching equipment, known from EP-A-0 264 046 at whose input terminal e1---ej---en leading to column lines s1---sj---sn of crosspoint matrix input digital signal circuits E1---Ej---En are provided and whose outputs a1---ai---am reached by row lines z1---zi---zm of the crosspoint matrix are provided with output amplifier circuits A1---Ai---Am. The crosspoint matrix comprises crosspoints KP11---KPij---KPmn whose matrix switching elements, as indicated in greater detail for a pair of switching elements Kij at the crosspoint KPij, can have a respective control input s controlled by an address decoder element or holding memory element, this, however, not having to be set forth in greater detail here since such drives of matrix elements are notoriously known in the art and appropriate explanations, moreover, may already be found elsewhere such as in DE-P-36 31 634.2.

The matrix input lines (column lines) are each respectively formed with two signal conductors sl′, sl″---sj′, sj″--sn′, sn″ that are respectively connected to complementary (differential) outputs of the respectively appertaining input digital signal circuit E1---Ej---En that is shown in FIG. 1 as an amplifier having a non-inverting output and an inverting output, i.e. as what is referred to as a differential line driver. The matrix input lines (column lines) sl′, sl″---sj′, sj″---sn′, sn″ therefore proceeding, on the one hand, from the complementary outputs of the input digital signal circuits E1--- Ej---En are connected to matrix output lines (row lines) on the other hand via crosspoints KP11---KPij---KPnm formed with pairs of switching elements (Kij at the crosspoint KPij in FIG. 1), these matrix output lines (row lines) being likewise respectively formed with two signal conductors zl′, zl″---zi′, zi″---zm′, zm″ and having these respectively leading to the two signal inputs of an output amplifier circuit A1---Ai---Am that is formed with a differential amplifier having a trigger behavior.

Such a differential amplifier having a trigger behavior can be realized with what is referred to as a gated flip-flop which is fundamentally known from the IEEE Journal of Solid-State Circuits, October 1973, pp. 319–323, FIG. 6, and is likewise already known from various modifications such as, for example, the German published application No. 24 22 136, FIG. 3, element 16′, and the German published application No. 26 08 119, FIG. 5, whereby a balancing transistor provided therein in the IEEE publication and in the German published application No. 24 22 136 as well as precharging transistors provided therein in the German published application No. 24 22 136, or, respectively, load transistors provided therein in the German published application No. 26 08 119 are to be expediently fashioned as p-channel transistors. A further possible realization is known from EP-A-0 264 046, FIG. 5.

FIGS. 2, 3 and 4 illustrate how the pairs of matrix switching elements Kij can be realized in circuit-oriented terms. The pairs of switching elements Kij respectively formed with two switching transistors Tnk′, Tnk″ that have their respective control electrodes charged with a through-connect signal or, respectively, inhibit signal and have the main electrode connected to the one or, respectively, to the other signal conductor zi′, zi″ of the appertaining matrix output line each respectively comprise two series transistors Tne′, Tne″ that respectively form a series circuit with a switching transistor Tnk′ or, respectively, Tnk″. These series transistors respectively have their control electrodes connected to the one signal conductor sj′ or, respectively, to the other signal conductor sj″ of the appertaining matrix input line (column line) sj and the respective main electrode facing away from the series circuit being connected via a sampling transistor Tna (namely Tnaij in FIG. 2 or, respectively, Tnaj in FIG. 3 or, respectively, Tnai in FIG. 4) to the one terminal $U_{ss}$ (ground) of the operating voltage source. The signal conductors zi′, zi″ of the respective matrix output line (row line) zi are respectively connected to the other terminal $U_{DD}$ of the operating voltage source via a pre-charging transistor Tpi′ or, respectively, Tpi″. The two pre-charging transistors Tpi′, Tpi″ have their main electrodes facing toward the respective matrix output line (zi′, zi″) connected to one another via a shunt transistor Tpi‴ whose control electrode is connected to the control electrodes of the pre-charging transistor Tpi′, Tpi″.

As also illustrated in FIG. 2, a respective sampling transistor Tnaij associated to a pair of switching elements can be provided. Alternatively, however, as shown in FIG. 3, a sampling transistor Tnaj that is shared by all pairs of switching elements lying at one and the same matrix input line (column line) sj and that, therefore, is associated to a matrix input line can be respectively provided or, as may be seen from FIG. 4, a sampling transistor (Tnai in FIG. 4) shared by all pairs of switching elements lying at one and the same matrix output line (row line) zi that, therefore, is associated to a matrix output line can be respectively provided. As may be seen from FIG. 3, a pre-charging transistor Tpaj associated to a matrix input line can be provided in addition to a sampling transistor Tnaj associated to a matrix input line and, as may be seen from FIG. 4, a precharging transistor Tpai associated to a matrix output line can be provided in addition to a sampling transistor Tnai associated to a matrix output line.

As also indicated in FIGS. 2–4, given a crosspoint matrix constructed in complementary-metal-oxide-semiconductor (CMOS) technology, the switching transistors Tnk, the series transistors Tne and the sampling transistors Tna can be n-channel transistors and the pre-charging transistors Tpi can be p-channel transistors. Opposite one another, pre-charging transistors Tpi and sampling transistors Tna respectively have their control electrodes connected with a clock T, as indicated in FIG. 5 at line T, that subdivides a bit through-connect time interval into a pre-charge phase pv and into a main phase ph in the manner indicated at the bottom of FIG. 5d.

Figure 5A:
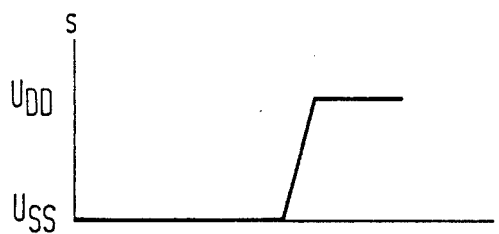
FIGS. 5a–5d provide graphic illustrations of signals which will be experienced in practicing the present invention.
Figure 5B:
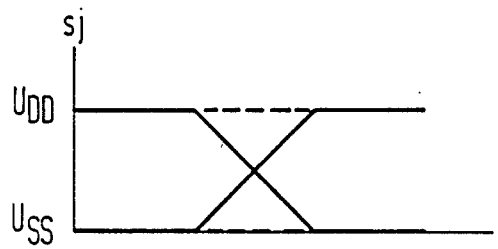
Figure 5C:
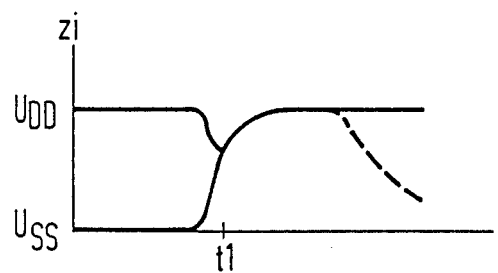
Figure 5D:
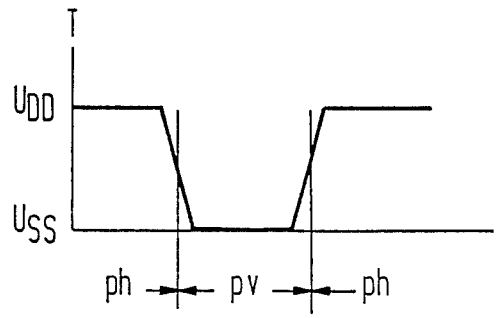

During the pre-charge phase pv, as shown at the bottom of FIG. 5d, the two respective signal conductors (zi', zi") of the matrix output lines (row lines) zi are charged at least approximately to the operating potential $U_{DD}$ FIG. 5c via the respective precharging transistor (Tpi' or, respectively, Tpi" in FIGS. 2–4), to which end the pre-charging transistors Tpi', Tpi" formed by p-channel transistors in the present example can be made transmissive by a "low" clock signal T (see line T, FIG. 5d). With the trailing edge of the clock signal T, the shunt transistor Tpi'" lying between the two signal conductors zi', zi" thereby also becomes simultaneously conductive, with the result of a short of the two signal conductors zi', zi" as a result whereof a balancing of potential of the two signal conductors zi', zi" initially occurs very quickly at the beginning of the pre-phase (the time t1 of FIG. 5c, line zi). Subsequently, thereto, both signal conductors zi', zi" (that are now balanced in terms of potential) are charged towards the operating potential $U_{DD}$ via the two pre-charging transistors Tpi', Tpi", whereby the overall charging time is shortened in that both pre-charging transistors Tpi', Tpi" are now involved in the charging event after the equalization of potential produced by the shunt transistor Tpi'".

Simultaneously with the unlocking of the pre-charging transistors Tpi', Tpi" and of the shunt transistor Tpi'", the transistors Tna (Tnaij of FIG. 2, Tnaj in FIG. 3 and Tnai in FIG. 4) formed by n-channel transistors are driven in the opposite sense in the example by the same "low" clock signal T, i.e. they are inhibited, so that the charging of the respective two signal conductors (zi', zi") of the matrix output lines (row lines) zi can proceed independently of the drive of the respective switching transistors Tnk', Tnk" (in FIGS. 2–4) and of the respective series transistors Tne', Tne" (in FIGS. 2–4) of the individual pairs of matrix switching elements Kij. As the lines sj in FIG. 5b shows, the potential corresponding to the respective bit to be through-connected can thereby already potentially build up (or, respectively, be maintained) on the respective matrix input line (column line) sj.

When, as shown in FIG. 3, a precharging transistor Tpaj associated to a matrix input line is provided in addition to a sampling transistor Tnaj associated to a matrix input line or, as shown in FIG. 4, a precharging transistor Tpai associated to a matrix output line is provided in addition to a sampling transistor Tnai associated to a matrix output line, then the pseudo-ground line PM is charged during the pre-charge phase pv via the pre-charging transistor (Tpaj in FIG. 3, Tpai in FIG. 4) wherewith the respective pair of matrix switching elements Kij is unburdened in this respect. Particularly given extensive crosspoint matrices having a multitude of pairs of matrix switching elements Kij connected to the pseudo-ground line PM, this leads to a noticeable shortening of the charging time that, in turn, fully enters into a corresponding increase in the working speed.

Due to the equality of potential of the two signal conductors zi', zi" produced by the shunt transistor Tpi'", the initial conditions for reliable amplification by the differential amplifier Ai (FIG. 1) are established correspondingly early, so that the following main phase ph (bottom of FIG. 5d) can already begin at a correspondingly earlier point in time. In the present example, the pre-charging transistors Tpi', Tpi" and the shunt transistor Tpi'" (in FIGS. 2–4) are inhibited in the main phase ph (see bottom of FIG. 5d) by a "high" clock signal T (see FIG. 5, line T) and the sampling transistors Tna (Tnaij in FIG. 2, Tnaj in FIG. 3, Tnai in FIG. 4) are simultaneously unlocked. When the switching transistors Tnk', Tnk" (in FIGS. 2–4) established in the example by n-channel transistors, are conductive in a pair of matrix switching elements Kij due to a through-connect signal (a "high" through-connect signal in the example, as shown in FIG. 5a, line s) applied at the control input s and when, therefore, the crosspoint is in its through-connect condition, then, dependent on the signal states prevailing on the two signal conductors sj', sj" of the appertaining matrix input line (column line) sj and corresponding to the bit to be through-connected, the signal conductors zi', zi" of the matrix output line (row line) zi connected to this matrix input line (column line) sj via the appertaining matrix switching element Kij will now be discharged or, respectively, will remain at the potential $U_{DD}$ assumed in the pre-phase pv. When the "low" signal state prevails on a signal conductor sj' or, respectively, sj" of the appertaining matrix input line (column line) sj and, correspondingly, the (n-channel) series transistor Tne' or, respectively, Tne" (in FIGS. 2–4) of the appertaining pair of matrix switching elements Kij is inhibited, then the appertaining signal conductor zi' or, respectively zi" of the matrix output line (row line) zi will not discharge via the appertaining matrix switching element of this pair of matrix switching elements Kij but will retain the potential $U_{DD}$ state insofar as no other crosspoint leading to this matrix output line (row line) zi is situated in the through-connect condition.

When, by contrast, the "high" signal state prevails on a signal conductor sj' or, respectively, sj" which was just under consideration in the matrix input line (column line) sj and, accordingly, the series transistor Tne' or, respectively, Tne" (in FIGS. 2–4) of the pair of matrix switching elements Kij under consideration as well as the switching transistor Tnk' or, respectively, Tnk" and the appertaining sampling transistor Tna are conductive, then the allocated signal conductor (zi' or, respectively, $z_i''$ of the matrix output line (row line) $z_i$ is discharged via this matrix switching element of the pair of matrix switching elements $K_{ij}$ and is drawn to the potential $U_{SS}$.

The respective input signal is therefore through-connected in an inverted form via a crosspoint that is unlocked proceeding from its control input s.

In the exemplary embodiment set forth above with reference to FIGS. 2–4, the pre-charging transistors $Tpi'$, $Tpi''$ are formed by p-channel transistors, whereby these p-channel precharging transistors $Tpi$ and the sampling transistors $Tna$ formed by n-channel transistors are controlled opposite one another by one and the same signal T as a consequence of the different channel type. In a departure thereof, however, it is also possible to realize the pre-charging transistors with n-channel transistors such that only transistors of one and the same channel type are employed when the switching transistors ($Tnk$), the series transistors ($Tne$) and the sampling transistors ($Tna$) are also n-channel transistors. So that the pre-charging transistors and the sampling transistors are then again respectively oppositely charged with the switching matrix network drive clock at their control electrodes, the switching matrix network drive clock signal (T), as in the exemplary embodiments set forth with reference to FIGS. 2–4, is to be directly supplied to the sampling transistors ($Tna$) but the inverted switching matrix network drive clock signal, by contrast, is to be supplied to the (n-channel) pre-charging transistors.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a broadband switching apparatus of the type including a field effect transistor matrix comprising a plurality of matrix input lines and a plurality of matrix output lines defining a plurality of crosspoints, in which each matrix input line comprises a pair of complementary input signal conductors and each matrix output line comprises a pair of complementary output signal conductors, each of said output lines having its output conductors connected to two signal inputs of a respective output amplifier formed of a differential amplifier having a trigger behavior, in which each of said crosspoints comprises a pair of switching transistors each including a respective main electrode connected to a respective output conductor and a control electrode connected to receive a through-connect signal, a pair of series transistors each connected in series with a respective switching transistor and each including a control electrode connected to a respective input conductor and a main electrode facing away from the series circuit connected via a sampling transistor to one terminal of an operating voltage source to whose other terminal each said output signal conductor is connected via a respective pre-charging transistor, said pre-charging and sampling transistors oppositely charged at respective control electrodes with a switching matrix drive clock that subdivides a through-connect time interval into a pre-charging phase and a through-connect phase so that both signal conductors of the matrix output line are pre-charged in each pre-charging phase at least approximately to the potential existing at said other voltage source terminal given an inhibited sampling transistor, the improvement comprising:

a shunt transistor connected across the main electrodes of said pre-charging transistors, which electrodes are connected to the respective output conductors, the control electrode of said shunt transistor being connected to said control electrodes of said pre-charging transistors for receiving the drive clock.

2. The improved broadband switching apparatus of claim 1, and further comprising:

a further pre-charging transistor associated to a matrix input line and connected between said main electrodes of said second switching transistors and a reference potential, and including a control electrode connected to receive said drive clock in addition to the sampling transistor which is associated to the respective matrix input line.

3. The improved broadband switching apparatus of claim 1, and further comprising:

a further pre-charging transistor associated to a matrix input line and connected between said main electrodes of said second switching transistors and a reference potential, and including a control electrode connected to receive said drive clock in addition to the sampling transistor which is associated to the respective matrix output line.

4. A switching matrix for broadband switching apparatus, comprising:

a plurality of input amplifier circuits each including an input and a pair of complementary outputs;

a plurality of output amplifier circuits each including a differential amplifier having a trigger behavior and including a pair of inputs and an output;

a plurality of input lines each comprising a pair of input conductors connected to respective ones of said outputs of a respective input amplifier circuit;

a plurality of output lines each comprising a pair of output conductors connected to respective ones of said inputs of said output amplifier circuits and an output; and a plurality of crosspoints operable to connect said inputs to said outputs, each of said crosspoints comprising a first pair of switching transistors each including a controlled current path connected to a respective conductor of a respective output line, and a control electrode connected to receive a through-connect signal which extends between ground and an operating potential, a second pair of switching transistors each including a controlled current path connected in series between a respective controlled current path of said first pair of switching transistors and a common point, and a control electrode connected to a respective conductor of an input line, a pair of pre-charging transistors each including a controlled current path connected in series between the operating voltage and a respective one of said output conductors of said output line, and a control electrode for receiving clock pulses, each of said clock pulses extending between the operating potential and ground and shaped to define a pre-charging phase and through-connect phase, a shunt transistor including a controlled current path connected across said conductors of said output line, and a control electrode connected to receive said clock pulses, and a sampling transistor including a controlled current path connected between said common point and ground, and a control electrode connected to receive said clock pulses.

5. A switching matrix for broadband switching apparatus, comprising:

a plurality of input amplifier circuits each including an input and a pair of complementary outputs;

a plurality of output amplifier circuits each including a differential amplifier having a trigger behavior and including a pair of inputs and an output;

a plurality of input lines each comprising a pair of input conductors connected to respective ones of said outputs of a respective input amplifier circuit;

a plurality of output lines each comprising a pair of output conductors connected to respective ones of said inputs of a respective output amplifier circuit, and an output; and a plurality of crosspoints operable to connect said inputs to said outputs, each of said crosspoints comprising a first pair of switching transistors each including a controlled current path connected to a respective conductor of a respective output line, and a control electrode connected to receive a through connect signal which extends between ground and an operating potential, a second pair of switching transistors each including a controlled current path connected in series between a respective controlled current path of said first pair of switching transistors and a common point, and a control electrode connected to a respective conductor of an input line, a pair of pre-charging transistors each including a controlled current path connected in series between the operating potential and a respective one of said output conductors of said output line, and a control electrode connected for receiving clock pulses, each of said clock pulses extending between the operating potential and ground and shaped to define a pre-charging phase and a through-connect phase, a shunt transistor including a controlled current path connected across said conductors of said output line, and a control electrode connected to receive said clock pulses, a pseudo-ground conductor associated with said input lines and connected to said common point, a sampling transistor including a controlled current path connected between said common point and ground, and a control electrode connected to receive said clock pulses, and a further pre-charging transistor including a controlled current path connected between said common point and the operating potential, and a control electrode connected to receive said clock pulses.

6. A switching matrix for broadband switching apparatus, comprising:

a plurality of input amplifier circuits each including an input and a pair of complementary outputs;

a plurality of output amplifier circuits each including a differential amplifier having a trigger behavior and including a pair of inputs and an output;

a plurality of input lines each comprising a pair of input conductors connected to respective ones of said outputs of a respective input amplifier circuit;

a plurality of output lines each comprising a pair of output conductors connected to respective ones of a respective output amplifier circuit; and a plurality of crosspoints operable to connect said inputs to said outputs, each of said crosspoints comprising a first pair of switching transistors each including a controlled current path connected to a respective conductor of a respective output line, and a control electrode connected to receive a through-connect signal which extends between ground and an operating potential, a second pair of switching transistors each including a controlled current path connected in series between a respective controlled current path of said first pair of switching transistors and a common point, and a control electrode connected to a respective conductor of an input line, a pair of pre-charging transistors each including a controlled current path connected in series between the operating potential and a respective one of said output conductors of said output line, and a control electrode for receiving clock pulses, each of said clock pulses extending between the operating potential and ground and shaped to define a pre-charging phase and a through-connect phase, a shunt transistor including a controlled current path connected across said conductors of said output line, and a control electrode connected to receive said clock pulses, a pseudo-ground conductor associated with said output lines and connected to said common point, a sampling transistor including a controlled current path connected between said common point and ground, and a control electrode connected to receive said clock pulses, and a further pre-charging transistor including a control current path connected between said common point and the operating potential, and a control electrode connected to receive said clock pulses.

* * * * *